(12) United States Patent
Fukuda et al.

(10) Patent No.: US 10,745,010 B2
(45) Date of Patent: Aug. 18, 2020

(54) DETECTING ANOMALOUS VEHICLE BEHAVIOR THROUGH AUTOMATIC VOTING

(71) Applicant: International Business Machines Corporation, Armonk, NY (US)

(72) Inventors: Mari Abe Fukuda, Tokyo (JP); Satoshi Hosokawa, Tokyo (JP); Yasutaka Nishimura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 15/850,533

(22) Filed: Dec. 21, 2017

(65) Prior Publication Data

US 2019/0193729 A1 Jun. 27, 2019

(51) Int. Cl.
*B60W 40/09* (2012.01)
*B60W 30/095* (2012.01)
*G08G 1/01* (2006.01)
*G08G 1/16* (2006.01)
*G08G 1/0967* (2006.01)

(52) U.S. Cl.
CPC ........ *B60W 30/0956* (2013.01); *B60W 40/09* (2013.01); *G08G 1/0112* (2013.01);
(Continued)

(58) Field of Classification Search
CPC ............. B60W 30/0956; B60W 40/09; B60W 2550/40; B60W 2550/20; G08G 1/0133;
(Continued)

(56) References Cited

U.S. PATENT DOCUMENTS 7,752,302 B2   7/2010  Thacher
8,973,129 B2   3/2015  Berg et al.
(Continued)

OTHER PUBLICATIONS

Entropy (information theory): Wikipedia. Downloaded Oct. 9, 2017. pp. 1-17.

(Continued)

*Primary Examiner* — Rachid Bendidi
*Assistant Examiner* — Ashley L Redhead, Jr.
(74) *Attorney, Agent, or Firm* — Mollborn Patents, Inc.; Fredrik Mollborn

(57) ABSTRACT

Methods and apparatus, including computer program products, implementing and using techniques for detecting anomalous vehicle behavior. It is determined whether a plurality of received car probes include one or more indicators of unusual behavior. An object agent corresponding to a vehicle having a car probe that includes an indicator of unusual behavior is selected. A search is performed to select one or more vehicles surrounding the vehicle having a car probe that includes an indicator of unusual behavior. An information entropy is determined from received car probes, for the vehicle having a car probe that includes an indicator of unusual behavior and for each of the selected surrounding vehicles. An anomalous point value is calculated for each vehicle, based on the determined information entropies. In response to determining that the anomalous point value for a car exceeds a pre-determined threshold, the vehicle is flagged as a vehicle exhibiting anomalous behavior.

19 Claims, 3 Drawing Sheets

(52) U.S. Cl.
CPC ......... *G08G 1/0133* (2013.01); *G08G 1/0141* (2013.01); *G08G 1/096775* (2013.01); *G08G 1/096791* (2013.01); *G08G 1/166* (2013.01); *G08G 1/167* (2013.01); *B60W 2554/00* (2020.02); *B60W 2556/45* (2020.02)

(58) Field of Classification Search
CPC ............ G08G 1/166; G08G 1/096775; G08G 1/096791; G08G 1/167; G08G 1/0141; G08G 1/0112
See application file for complete search history.

(56) References Cited

U.S. PATENT DOCUMENTS

| | | |
|---|---|---|
| 9,460,616 B1 | 10/2016 | Miyahira et al. |
| 9,576,480 B1 | 2/2017 | Shoshan |
| 9,619,203 B2 | 4/2017 | Tamir et al. |
| 9,671,791 B1* | 6/2017 | Paczan .................. B64C 39/024 |
| 2016/0035220 A1 | 2/2016 | Paromtchik et al. |
| 2017/0018180 A1 | 1/2017 | Hubbard et al. |
| 2017/0154529 A1* | 6/2017 | Zhao ..................... B60W 30/12 |

OTHER PUBLICATIONS

Lund et al: "Dynamic Wide-Area Congestion and Incident Monitoring Using Probe Data"; Transportation Research Record: Journal of the Transportation Research Board; ISSN: 0361-1981; vol. 2174, 2010. pp. 1-9.

* cited by examiner

DETECTING ANOMALOUS VEHICLE BEHAVIOR THROUGH AUTOMATIC VOTING

BACKGROUND

The present invention relates to automotive applications, and more specifically, to detecting vehicles that behave in an anomalous fashion.

Being able to detect vehicles that behave in an anomalous way is crucial for creating a safe driving environment. For example, occasionally there may be vehicles entering a highway from an exit, going down a one-way road in the wrong direction, driving erratically in a zig-zag line, and so on. Such behaviors can be quite dangerous not only for the driver herself, but also for any other drivers in the vicinity, and must be detected in real time, such that other drivers, pedestrians, bicyclists, etc. can be notified as quickly as possible.

One approach for detecting such an anomalous vehicle involves defining anomalous patterns as rules, that is, informing a traffic monitoring system about anomalous trajectories that are not allowed for vehicles, or defining a rule in the system for comparing the road direction and the heading of vehicles, in order to detect vehicles that are moving the wrong way. Another approach involves using sensors installed on, for example, toll gates of roads, such as ETC in Japan, or EZ-Pass in the United States, such that the sensors can detect vehicles that are moving wrong way.

However, each of these approaches each has its own disadvantages. For example, using rules essentially depends on human efforts and heuristics. Using sensors on gates can only be applied to very limited area. In real situations, however, anomalous patterns highly depend on dynamic situations that frequently change. For example, if there is an obstacle in your lane of the road, it may be appropriate to momentarily go down the wrong side of the road to avoid vehicle accident, assuming there is no oncoming traffic, of course. Human effort and heuristics to define anomalous vehicle behavior would thus need to increase in proportion to the frequency of changes of actual situations, including routes, maps, regulations, etc. Therefore, better methods are needed for detecting anomalous behavior by vehicles.

SUMMARY

According to one embodiment of the present invention, methods, systems and computer program products are provided for detecting anomalous vehicle behavior. It is determined whether a plurality of received car probes include one or more indicators of unusual behavior. An object agent corresponding to a vehicle having a car probe that includes an indicator of unusual behavior is selected. A search is performed to select one or more vehicles surrounding the vehicle having a car probe that includes an indicator of unusual behavior. An information entropy is determined from received car probes, for the vehicle having a car probe that includes an indicator of unusual behavior and for each of the selected surrounding vehicles. An anomalous point value is calculated for each vehicle, based on the determined information entropies. In response to determining that the anomalous point value for a car exceeds a pre-determined threshold, the vehicle is flagged as a vehicle exhibiting anomalous behavior.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

The various embodiments of the invention pertain to techniques for inferring anomalous behavior of a vehicle by other vehicles around the anomalous vehicle. This allows vehicles that behave anomalously, and which may influence surrounding vehicles, to be detected. Further, this also results in driving behavior analysis becoming more accurate than it would have been if only data from a single vehicle were used. The data collected by the surrounding vehicles can be used in a number of ways. For example, the data can be displayed on a dashboard of a control center, nearby vehicles can be notified about the existence of the anomalous vehicle. New metrics can be added to driving behavior analysis (e.g. whether a vehicle is driven in a way that negatively influences surrounding vehicles) to be aware of dangerous driving behavior. Various embodiments of the invention will now be explained by example and with reference to the drawings. It should be noted that while the examples below refer to cars, which may be manned or unmanned, the same concepts can be applied to essentially any type of vehicle, such as motorbikes, bicycles, airplanes, vessels, drones, or even humans carrying a digital device, etc., just to mention a few examples.

Figure 1:
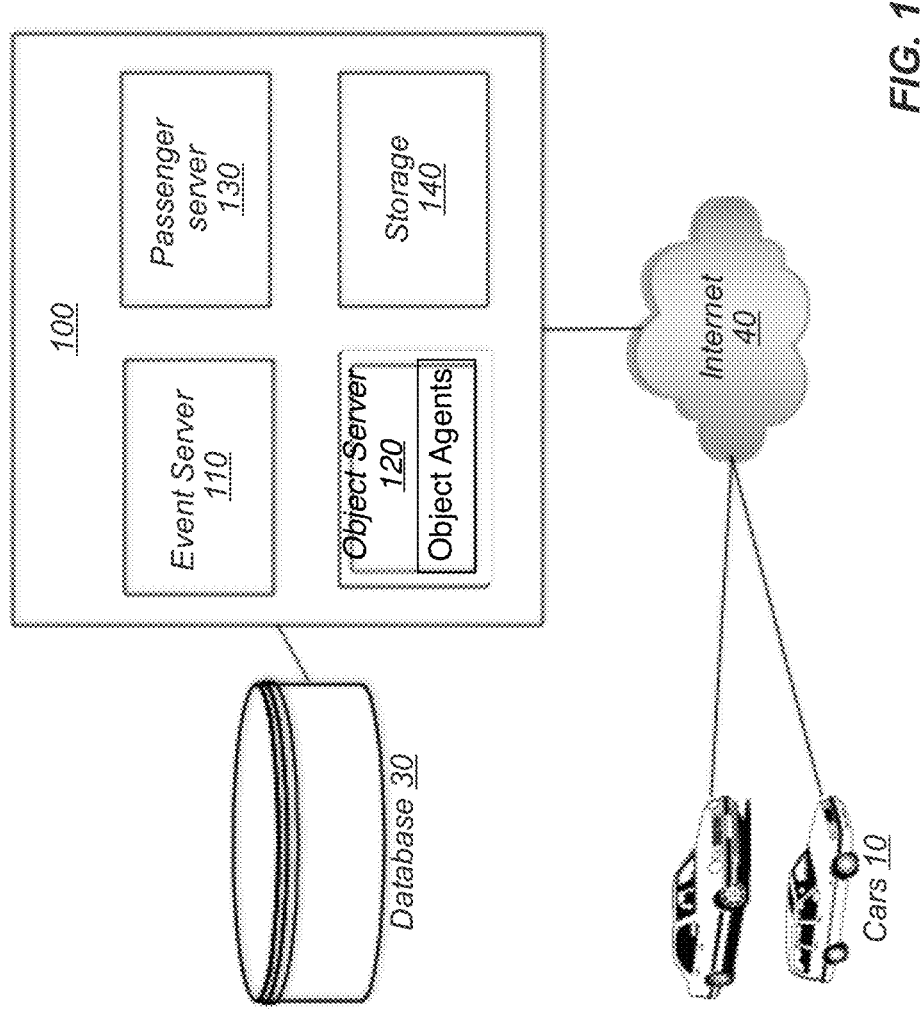
FIG. 1 shows a system 100 for detecting anomalous vehicle behavior, in accordance with one embodiment.

FIG. 1 shows a system 100 in accordance with one embodiment of the invention. Other systems in which various embodiments of the application can be implemented are described in U.S. Pat. No. 9,460,616, which is assigned to International Business Machines Corporation, the assignee of the present application, and which is incorporated herein in its entirety. Further, it should be noted that while the system 100 of FIG. 1 only shows single copies of servers, vehicles, databases, etc., for the ease of illustration, in many embodiments, the system may include several instances of the same type of servers, databases, etc. Thus, the system 100 is not limited to the particular embodiment illustrated in FIG. 1.

As can be seen in FIG. 1, in one embodiment, the system 100 includes an event server, an object server 120, an optional passenger server 130, and a storage 140. The event server 110 manages events occurring in a geographical region. The object server 120 manages information pertaining to the cars 10 in the geographical region. The optional passenger server 130 manages information of at least one passenger riding in a car 10. The storage 140 stores setting values and the like for the system 100.

It should be noted that while the event server 110, the object server 120, and the passenger server are shown in FIG. 1 as separate servers, they may also be implemented on the same server in various combinations. These servers may exist at any point on a network including the Internet, a subscriber network, a cellular network, or a desired combination of networks. The servers may be computers or other types of data processors, and may be dedicated servers, or may be shared servers that perform other operations.

The system 100 acquires the positions of a car 10 from the car 10, and the object server 120 manages the movement of this car 10. The system 100 acquires information of events that have occurred to the car 10 and/or on the road outside, and the event server 110 manages the state of the event. Examples of events include information about accidents, obstructions, closures, limitations, status, or construction on the road, or information about the weather, temperature, buildings, shops, or parking lots near the road. In response to a setting or a request from the car 10, the system 100 may provide notification about the event information to the car 10 that made the request.

The event server 110 manages at least one event agent, and executes each event agent to manage events on routes in its region. An "agent" as used herein may refer to a software entity having specific data, and may operable to receive a message (e.g. command), and return a result of the message. In one embodiment, the event server 110 may perform, through the event agents, (i) registration, update and/or deletion of events, (ii) registration, update and/or deletion of candidate events, and (iii) provision of event information.

The object server 120 may include one or more object agents, each of which is assigned to each of the cars 10. The object server 120 executes each of the object agents to manage the cars 10 traveling in its region. In one embodiment, the object server 120 may perform, through the object agents, (i) processing of the car probes, (ii) update of information of the car, and (iii) provision of information to the car. For example, the object server 120 may execute the object agent to collect information of events from the event server 110, and provide the car 10 with information that assists the car 10 with traveling in the geographic space.

Typically, there is an object agent for each car 10, which contains information about the car. In one embodiment, the object agent may contain an identification (ID) of the car 10, an ID of a passenger of the car 10, and a characteristic of the car 10 (e.g., model/version information, width, length, and/or height of the car), but as the skilled person realizes many modifications are possible within the scope of the invention as claimed.

The system 100 acquires map data corresponding to the geographical area where a car 10 is positioned from an external database 30, for example, through the Internet, a subscriber network, a cellular network, or any desired combination of networks. The system may further acquire an event that has occurred within the geographic space to be managed by the system 100, such as accident information, traffic information, weather information, time information, etc.

The storage 140 stores setting values or the like of the system 100, such as intermediate data, calculation results, threshold values, parameters, and the like that are generated by or used in the operations of the system 100. In response to a request from any component within the system 100, the storage 140 may supply the data stored therein to the component making the request. The storage 140 may be a computer readable storage medium such as an electric storage device, a magnetic storage device, an optical storage device, an electromagnetic storage device, or a semiconductor storage device.

During operation, each car 10 typically transmits information to the system 100 at designated time intervals, such as every second. This information is referred to herein as car probes and include information detected by the car 10, such as position information of the car 10. In one embodiment, the position information may include longitude and latitude (and optionally altitude information) of the car 10 in an absolute coordinate system. In another embodiment, the car 10 may determine its location in the absolute coordinate system by using GPS (Global Positioning System), and the system may determine a route on which the car 10 exists and a specific location based on the position information. Alternatively, the car 10 may include such detailed position information in the car probe data.

The car probes can be sent and received, for example, over the Internet 40 using wireless communication, a subscriber network, a cellular network, or any desired combination of networks.

The passenger server 130 includes a passenger agent that contains information of at least one passenger. Typically, each passenger agent corresponds to a passenger or candidate passenger of cars 10, and contains information thereof. In one embodiment, the passenger agent may contain an ID of a passenger and a characteristic of the passenger (e.g., information of age, gender, type, and the like of license of the passenger). The passenger server 130 may perform, through the passenger agent, provision and/or update of information of the passengers.

Figure 2:
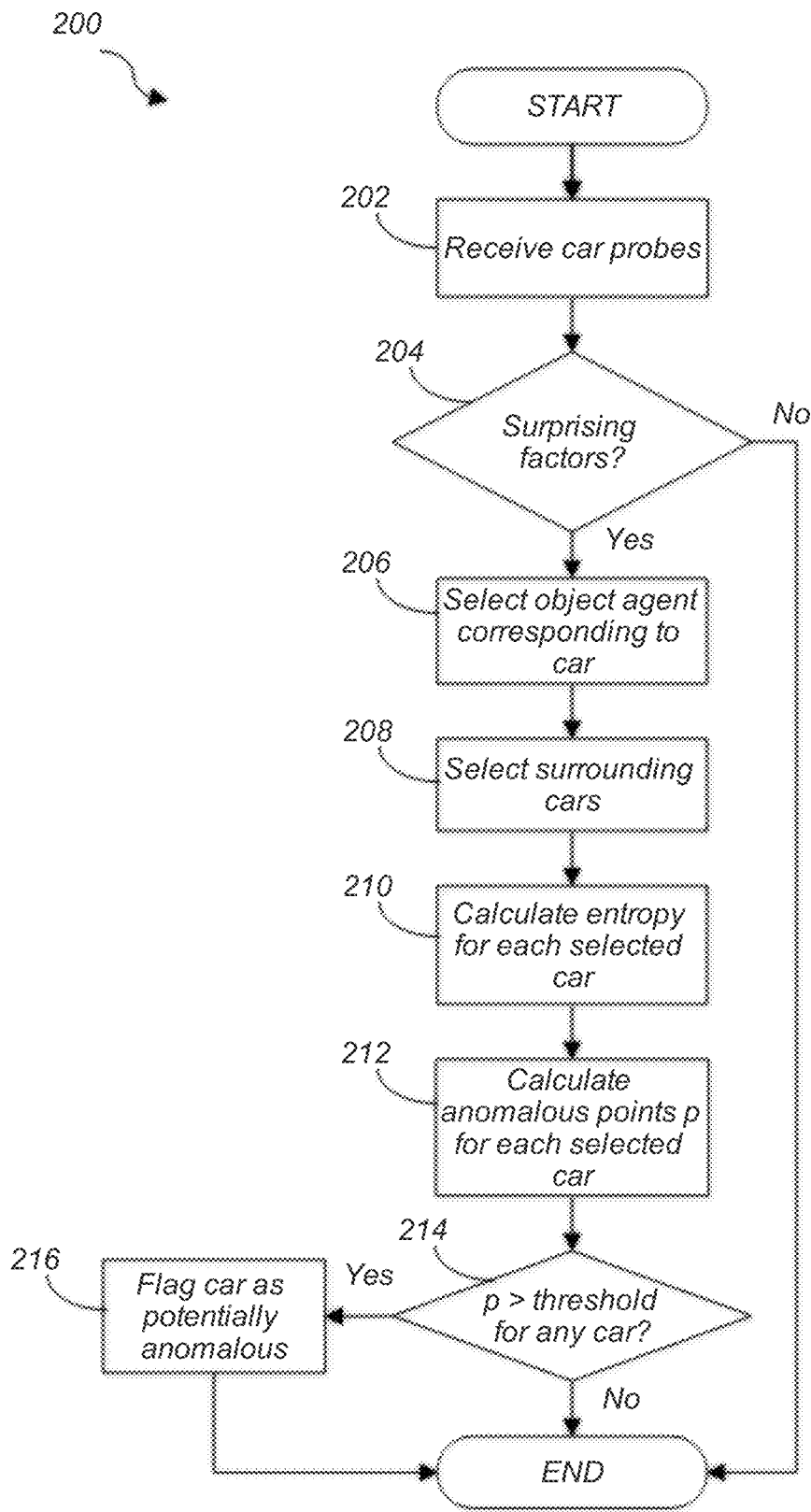
FIG. 2 shows a process 200 for detecting anomalous vehicle behavior, in accordance with one embodiment.

FIG. 2 shows a schematic flowchart of a process 200 for automatically voting and assigning an anomalous point value to a car that is observed to behave anomalously, in accordance with one embodiment. Typically, the process 200 is executed for each car 10 continuously repeated, although in some embodiments, it can occur on an intermittent basis.

As can be seen, process 200 starts by receiving several car probes from a car, step 202. As was described above, car probes typically include data such as GPS coordinates, a timestamp, and attributes related to the driving of the car that can be retrieved from a Controller Area Network (CAN) in the car, such as speed, engine RPM, etc. The car probes are transmitted from the car to the system 100 on a regular basis, for example, every second.

The process then checks whether the received car probes include any "indicators of unusual behavior," step 204. What is considered to be an "indicator of unusual behavior" can be predefined, for example, by a service provider and be provided as a service to the drivers. For example, an insurance company may define one set of indicators of unusual behavior that relate to safe driving for new drivers and another set of indicators of unusual behavior that relate to safe driving for elderly drivers. Some examples of indicators of unusual behavior include rapid braking, veering from side to side, rapid acceleration, abrupt steering, etc., of the vehicle. If there are no indicators of unusual behavior, the process 200 ends.

However, if indicators of unusual behavior are present, then an object agent corresponding to the car probe is selected in the system 100, step 206. In some embodiments, in the event that the driver does not use the service, the system 100 can create a "virtual object agent." This virtual object agent is a digital expression of a car that does not use the service, and therefore whose existence is "probable" but not certain.

Next, the process identifies one or more other cars 10 that will also be voted on, based on their respective car probes, step 208. These cars 10 are referred to herein as "surrounding cars." In one embodiment, the surrounding cars are selected using a topology-based search. Topology-based search in this context refers to a search method based on a map that includes a node-link network. That is, it is possible to identify cars that run on the same link (that is, the same road) either ahead of or behind the car that is behaving suspiciously. This allows a more exact identification of cars compared to merely identifying cars using a GPS-centered circle. Topology-based searches are very common in the context of route search services and are well-known to those having ordinary skill in the art.

Next, an information entropy H is calculated from the car probes for each selected car, step 210. The information entropy expresses to what extent the indicators of unusual behavior are anomalous, and is calculated for each vehicle for each indicator of unusual behavior. For example, the information entropy H for "abrupt steering" of Driver A may be "0.8," while the information entropy H for "abrupt steering" of Driver B may be "0.5." In this example, Driver A has high entropy of abrupt steering because Driver A does less abrupt steering than Driver B.

In one embodiment, the information entropy can be calculated as follows:

Let an indicator of unusual behavior j of car i be $f_{ij}$. Further let a probability of $f_{ij}$ is P $f_{ij}$, and the information entropy of $f_{ij}$ be $H(f_{ij})$. Then the information entropy $H(f_{ij})$ can be calculated by the following equation:

$$H(f_{ij}) = -P_{fij} \log P_{fij} - (1-P_{fij})\log(1-P_{fij})$$

If there is no historical data for $f_{ij}$, that is, no saved car probes for that particular car in the system 100, then it follows from this equation that $H(f_{ij})=1$.

Once the information entropy has been calculated, anomalous points p are calculated for each car, step 212. In one embodiment, these anomalous points p for a car are calculated by dividing the information entropy for the car by the number of surrounding cars. For example, if the car probes for a car indicated an abrupt steering event and there were three surrounding cars, the "abrupt steering" information entropy for that car would be divided by three to obtain the anomalous point value for the car.

Finally, the process checks whether the anomalous point value p for any of the cars exceeds a pre-determined threshold value, step 214. In no p-value exceeds the threshold value, the process 200 ends. If there is one or more car with a p-value that exceeds the threshold value, such cars are flagged as a potentially anomalous car, step 216, and the process 200 ends. The threshold value can, for example, be provided by users or predefined by service provider (e.g. 5 points). As the skilled person realizes, the process described herein is likely more robust when there are many cars, such as on a high-way with a certain traffic volume. In a scenario with little traffic, the quality of the result may be lower.

Figure 3:
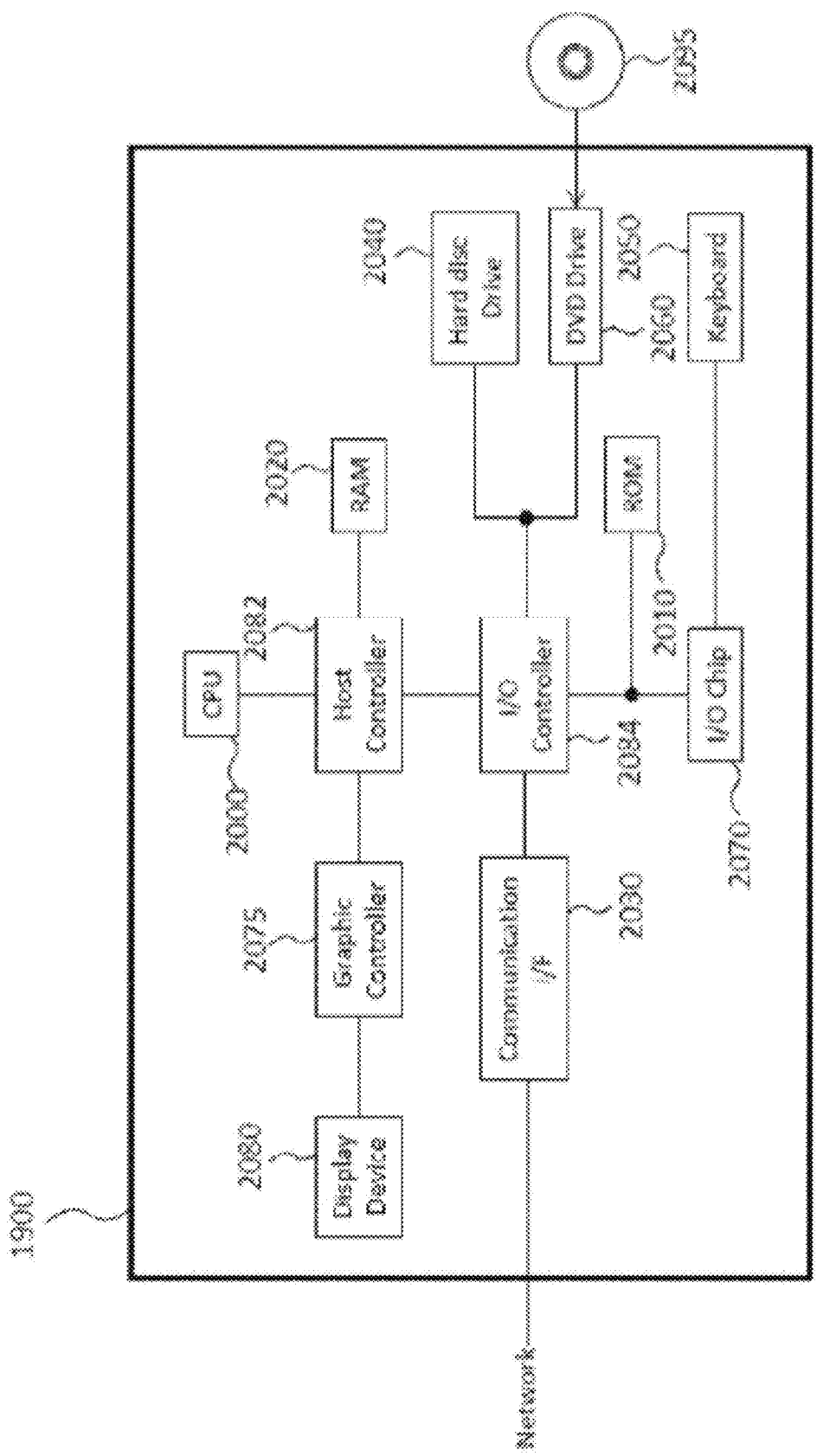
FIG. 3 shows a computer 1900, in accordance with one embodiment.

FIG. 3 shows an exemplary configuration of a computer 1900 in accordance with one embodiment. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as the event server 110, the object server 120 and the passenger server 130 in the system 100 of FIG. 1, includes a determining module. The program or module acts on the CPU 2000, to cause the computer 1900 to function as one or more sections, components, or elements of the system 100 of FIG. 1.

The information processing described in these programs is read into the computer 1900, to function as the determining section, which is the result of cooperation between the program or module and the above-mentioned various types of hardware resources. Moreover, the apparatus is constituted by realizing the operation or processing of information in accordance with the usage of the computer 1900.

For example, when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020, such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting anomalous vehicle behavior, comprising:
    determining whether a plurality of received car probes include one or more indicators of unusual behavior;
    selecting an object agent in an object server, the object agent corresponding to a vehicle having a car probe that includes an indicator of unusual behavior;
    performing a search to select one or more vehicles surrounding the vehicle having the car probe that includes the indicator of unusual behavior;
    determining an information entropy, from received car probes, for the vehicle having the car probe that includes the indicator of unusual behavior and for each of the selected surrounding vehicles;
    calculating an anomalous point value for each selected surrounding vehicle, based on the determined information entropies; and
    in response to determining that the anomalous point value for a a surrounding vehicle among the one or more surrounding vehicles exceeds a pre-determined threshold, flagging the surrounding vehicle as a vehicle exhibiting anomalous behavior.

2. The method of claim 1, wherein the search is a topology-based search that yields vehicles that are on the same route as the vehicle having a car probe that includes an indicator of unusual behavior.

3. The method of claim 1, further comprising:
    notifying one or more of the surrounding vehicles about a vehicle that has been flagged as exhibiting anomalous behavior.

4. The method of claim 1, wherein the vehicles include one or more of: manned vehicles and unmanned vehicles.

5. The method of claim 1, wherein the vehicles include one or more of: cars, motorbikes, bicycles, airplanes, vessels, drones, and humans carrying a digital device.

6. The method of claim 1, further comprising receiving car probes from vehicles regularly at designated time intervals, and wherein the car probes include one or more of: position information of the vehicle sending the car probe, a time stamp, and an attribute retrieved from a controller area network in the vehicle.

7. The method of claim 1, wherein the indicators of unusual behavior are pre-defined by a service provider.

8. The method of claim 1, wherein the information entropy is calculated for each vehicle and each indicator of unusual behavior.

9. A system for detecting anomalous vehicle behavior comprising:
    one or more event servers configured to manage events occurring in a geographical region;
    one or more object servers configured to manage information pertaining to vehicles in the geographical region;
    a processor; and
    a memory containing instructions that when executed by the processor causes the following method to be performed by the processor:
        determining whether a plurality of received car probes include one or more indicators of unusual behavior;

selecting an object agent in an object server, the object agent corresponding to a vehicle having a car probe that includes an indicator of unusual behavior;

performing a search to select one or more vehicles surrounding the vehicle having the car probe that includes the indicator of unusual behavior;

determining an information entropy, from received car probes, for the vehicle having the car probe that includes the indicator of unusual behavior and for each of the selected surrounding vehicles;

calculating an anomalous point value for each selected surrounding vehicle, based on the determined information entropies; and in response to determining that the anomalous point value for a surrounding vehicle among the one or more surrounding vehicles exceeds a pre-determined threshold, flagging the surrounding vehicle as a vehicle exhibiting anomalous behavior.

10. The system of claim 9, wherein the events managed by the one or more event servers include one or more of: accidents, obstructions, closures, limitations, status, or construction on a road in the geographical region, or information about the weather, temperature, buildings, shops, or parking lots near a road in the geographical region.

11. The system of claim 9, wherein the information pertaining to vehicles managed by the one or more object servers is managed by object agents inside the object servers and wherein the information management includes one or more of: processing of car probes, updating information pertaining to a vehicle, and providing information to a vehicle.

12. The system of claim 9, further comprising a passenger server configured to manage information pertaining to at least one passenger riding in a vehicle.

13. The system of claim 9, further comprising a storage configured to store setting values for the system, including one or more of: intermediate data, calculation results, threshold values, parameters, and the like that are generated by or used during operation of the system.

14. The system of claim 9, wherein the search is a topology-based search that yields vehicles that are on the same route as the vehicle having a car probe that includes an indicator of unusual behavior.

15. The system of claim 9, wherein the method further comprises:
notifying one or more of the surrounding vehicles about a vehicle that has been flagged as exhibiting anomalous behavior.

16. The system of claim 9, wherein the method further comprises:
receiving car probes from vehicles regularly at designated time intervals, and wherein the car probes include one or more of: position information of the vehicle sending the car probe, a time stamp, and an attribute retrieved from a controller area network in the vehicle.

17. The system of claim 9, wherein the indicators of unusual behavior are pre-defined by a service provider.

18. The system of claim 9, wherein the information entropy is calculated for each vehicle and each indicator of unusual behavior.

19. A computer program product detecting anomalous vehicle behavior, the computer program product comprising a computer readable storage medium having program instructions embodied therewith, wherein the computer readable storage medium is not a transitory signal per se, the program instructions being executable by a processor to cause the processor to perform a method comprising:

determining whether a plurality of received car probes include one or more indicators of unusual behavior;

selecting an object agent in an object server, the object agent corresponding to a vehicle having a car probe that includes an indicator of unusual behavior;

performing a search to select one or more vehicles surrounding the vehicle having the car probe that includes the indicator of unusual behavior;

determining an information entropy, from received car probes, for the vehicle having the car probe that includes the indicator of unusual behavior and for each of the selected surrounding vehicles;

calculating an anomalous point value for each selected surrounding vehicle, based on the determined information entropies; and in response to determining that the anomalous point value for a surrounding vehicle among the one or more surrounding vehicles exceeds a pre-determined threshold, flagging the surrounding vehicle as a vehicle exhibiting anomalous behavior.

* * * * *